(12) United States Patent
Truncale et al.

(10) Patent No.: US 8,957,355 B1
(45) Date of Patent: Feb. 17, 2015

(54) INERTIAL MEASUREMENT UNIT APPARATUS FOR USE WITH GUIDANCE SYSTEMS

(75) Inventors: Angelo Truncale, Lake Forest, CA (US); James K. Gingrich, Newark, OH (US); Stephen T. Butscher, Huntington Beach, CA (US); Joseph E. Justin, Corona, CA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 13/452,439

(22) Filed: Apr. 20, 2012

Related U.S. Application Data

(60) Provisional application No. 61/591,202, filed on Jan. 26, 2012.

(51) Int. Cl.
*F42B 15/01* (2006.01)
*G01C 21/10* (2006.01)
*F42B 15/00* (2006.01)
*G01C 21/00* (2006.01)

(52) U.S. Cl.
USPC ............ 244/3.2; 244/3.1; 244/3.15; 701/400; 701/408; 701/500; 439/55; 439/65; 439/68; 74/5 R

(58) Field of Classification Search
USPC ................. 701/400, 408, 500–512, 1, 23, 28; 244/3.1, 3.15–3.2; 257/414–420, 678, 257/723; 73/488, 504.02, 504.08, 504.12, 73/504.16, 510–512, 514.01–514.38, 526; 703/23; 438/22, 39; 439/55, 64, 65, 68; 250/200, 201.1, 204; 216/2; 74/5 R, 74/5.4, 5.41, 5.46

See application file for complete search history.

(56) References Cited

U.S. PATENT DOCUMENTS

| | | | | |
|---|---|---|---|---|
| 3,816,000 A * | 6/1974 | Fiedler | ............................ | 250/204 |
| 4,619,490 A * | 10/1986 | Hawkings | ......................... | 439/64 |
| 4,945,765 A * | 8/1990 | Roszhart | .................... | 73/514.29 |
| 5,061,930 A * | 10/1991 | Nathanson et al. | ........... | 244/3.19 |
| 5,886,286 A * | 3/1999 | Will et al. | ....................... | 244/3.2 |
| 6,035,714 A * | 3/2000 | Yazdi et al. | ................. | 73/514.32 |
| 6,131,068 A * | 10/2000 | Kau | ............................... | 701/505 |
| 6,143,583 A * | 11/2000 | Hays | ................................ | 438/39 |
| 6,166,437 A * | 12/2000 | Dhong et al. | .................. | 257/723 |
| 6,167,757 B1 * | 1/2001 | Yazdi et al. | ................. | 73/514.32 |
| 6,298,318 B1 * | 10/2001 | Lin | .................................. | 703/23 |
| 6,308,569 B1 * | 10/2001 | Stewart | ...................... | 73/514.32 |
| 6,311,555 B1 * | 11/2001 | McCall et al. | ................... | 73/488 |
| 6,349,249 B1 * | 2/2002 | Cunningham | ................... | 701/28 |
| 6,374,672 B1 * | 4/2002 | Abbink et al. | .............. | 73/504.12 |
| 6,402,968 B1 * | 6/2002 | Yazdi et al. | ......................... | 216/2 |
| 6,456,939 B1 * | 9/2002 | McCall et al. | ................. | 701/501 |
| 6,563,184 B1 * | 5/2003 | Kubena et al. | ................ | 257/419 |
| 6,580,138 B1 * | 6/2003 | Kubena et al. | ................. | 257/415 |
| 6,615,681 B1 * | 9/2003 | Jenkins et al. | ................. | 74/5.46 |
| 6,701,788 B2 * | 3/2004 | Babala | ............................ | 73/510 |
| 6,835,587 B2 * | 12/2004 | Kubena et al. | ................. | 257/414 |
| 6,841,838 B2 * | 1/2005 | Kubena et al. | ................. | 257/415 |
| 6,859,751 B2 * | 2/2005 | Cardarelli | .................. | 73/504.12 |
| 6,891,239 B2 * | 5/2005 | Anderson et al. | ............. | 257/414 |

(Continued)

*Primary Examiner* — Bernarr Gregory
(74) *Attorney, Agent, or Firm* — Hanley, Flight & Zimmerman, LLC

(57) ABSTRACT

Inertial measurement unit apparatus for use with guidance systems are disclosed herein. An example guidance system includes an inertial measurement unit removably coupled in a cavity of a guidance wafer via an access port of the guidance wafer defining a port axis that is non-parallel relative to a longitudinal axis of the guidance wafer.

22 Claims, 5 Drawing Sheets

(56) References Cited

U.S. PATENT DOCUMENTS

| | | | |
|---|---|---|---|
| 6,925,876 B2 * | 8/2005 | Babala | 73/504.02 |
| 6,975,009 B2 * | 12/2005 | Kubena et al. | 257/414 |
| 7,040,166 B2 * | 5/2006 | Babala | 73/514.35 |
| 7,237,437 B1 * | 7/2007 | Fedora | 73/510 |
| 7,566,026 B2 * | 7/2009 | Lam et al. | 244/3.15 |
| 7,836,765 B2 * | 11/2010 | Challoner et al. | 73/504.12 |
| 8,113,045 B1 * | 2/2012 | Lee et al. | 73/526 |
| 8,250,921 B2 * | 8/2012 | Nasiri et al. | 73/511 |
| 8,368,154 B2 * | 2/2013 | Trusov et al. | 257/417 |
| 8,710,599 B2 * | 4/2014 | Marx et al. | 257/417 |

* cited by examiner

INERTIAL MEASUREMENT UNIT APPARATUS FOR USE WITH GUIDANCE SYSTEMS

RELATED APPLICATIONS

This patent claims the benefit of U.S. Provisional Patent Application Ser. No. 61/591,202, filed Jan. 26, 2012, titled "Inertial Measurement Unit Apparatus for use with Guidance Systems," which is hereby incorporated herein by reference in its entirety.

FIELD

The present disclosure relates generally to guidance systems and, more particularly, to inertial measurement unit apparatus for use with guidance systems.

BACKGROUND

Systems such as missiles, spacecraft, airplanes or moving objects often employ guidance systems for orientating the system relative to earth. Some known ballistic missiles, for example, employ a guidance system to direct the flight path or trajectory of the missile based on a predetermined or desired target location. The guidance systems are typically inertial navigation or guidance systems that employ a measuring unit to detect the direction, position and/or speed of the missile.

Guidance systems such as, for example, inertial navigation or guidance systems can continuously calculate the position, orientation, and/or velocity (e.g., a direction and/or speed of movement) of a moving object without use of external references. An inertial guidance system includes an inertial measurement unit or an inertial measuring unit (IMU) having, for example, a processor, one or more motion sensing devices such as, for example, gyroscopes, accelerometers, and/or other motion-sensing devices or the like. The inertial guidance system is initially provided with its position and velocity from another source (e.g., a GPS satellite receiver or site survey, etc.), and thereafter computes an updated position and velocity by integrating information received from the motion sensors. Thus, an inertial guidance system does not require external references to determine its position, orientation, or velocity once its position has been initialized. Further, because inertial guidance systems do not require an external reference after initialization, the inertial guidance systems are immune to jamming and/or deception.

Due to their accuracy and resistance to jamming, inertial guidance systems are often used in intercontinental ballistic missiles (ICBM). An inertial guidance system is often disposed in a guidance section or portion of the ballistic missile, which is typically located beneath a weapons section or payload carried by the ballistic missile. For example, the inertial measurement unit typically includes a module to support or house motion-sensing devices or apparatus such as, for example, accelerometers, gyroscopes, and/or other motion-sensing devices that is disposed in the guidance wafer of the ballistic missile.

However, some known inertial guidance systems or inertial measurement units have a relatively large dimensional envelope or size (e.g., a height or length of approximately 20 inches). Due to the large dimensional envelope of the guidance system, a portion of the guidance system may protrude axially into adjacent wafers (e.g., a third motor wafer, a wafer downstage, a motor wafer, etc.) above and/or below the guidance wafer of the missile. In other words, a dimensional thickness or height of known guidance systems may be greater than a dimensional thickness or height of a guidance wafer in which the guidance system is housed when coupled to a ballistic missile.

As a result of the large dimensional envelope of the guidance system, the guidance section or portion of most ballistic missiles is removed and replaced with a new guidance section. Removing the guidance section of the ballistic missile often involves removing the weapons (e.g., nuclear warheads) of the ballistic missile and then reattaching the weapons when the guidance section is repaired or replaced.

For example, servicing the guidance system of ballistic missile typically requires removal of the guidance system via an opening provided in a top portion of the missile by removing a nose cone and a weapons wafer (which may include nuclear warheads) of the missile. In other words, the weapons wafer of the ballistic missile is typically removed to provide an access opening having an axis that is substantially coaxially aligned with a longitudinal axis of the missile to field service and/or replace a known guidance system and/or inertial measurement unit employed with a ballistic missile. Thus, accessing, servicing and/or replacing a guidance system of a ballistic missile often requires partial disassembly of the ballistic missile. Such an approach is labor intensive, relatively complex, and/or increases security risks and opportunities for damaging other sensitive equipment of the ballistic missile during disassembly.

In some instances, known ballistic missiles having nuclear warheads are often housed or contained within a protective concrete silo formed in the ground. In such examples, to gain access to the guidance wafer, the ballistic missile may need to be hoisted from the concrete silo containing the ballistic missile to expose the guidance section. Thus, the weapons may be exposed above ground and/or outside of the protective concrete silo. As a result, replacement of the guidance section often requires deployment of extensive security force and protocol when the weapons are exposed.

For example, to replace a guidance system of a ballistic missile stored in a silo, a silo cover is removed and sections of the ballistic missile are removed or lifted out of the silo, including the weapons wafer. For example, sections of the ballistic missile are lifted from within the silo via machinery starting with the nose cone. After the nose cone is removed, the weapons wafer is removed to enable access to the guidance system in the guidance wafer below it. Safety protocol may require a helicopter to be on standby to respond to any security breaches such as, for example, security breaches involving the removed weapons wafer. Additionally, such a process requires removal of the weapons wafer containing nuclear warheads from the protective concrete silo.

Figure 1:
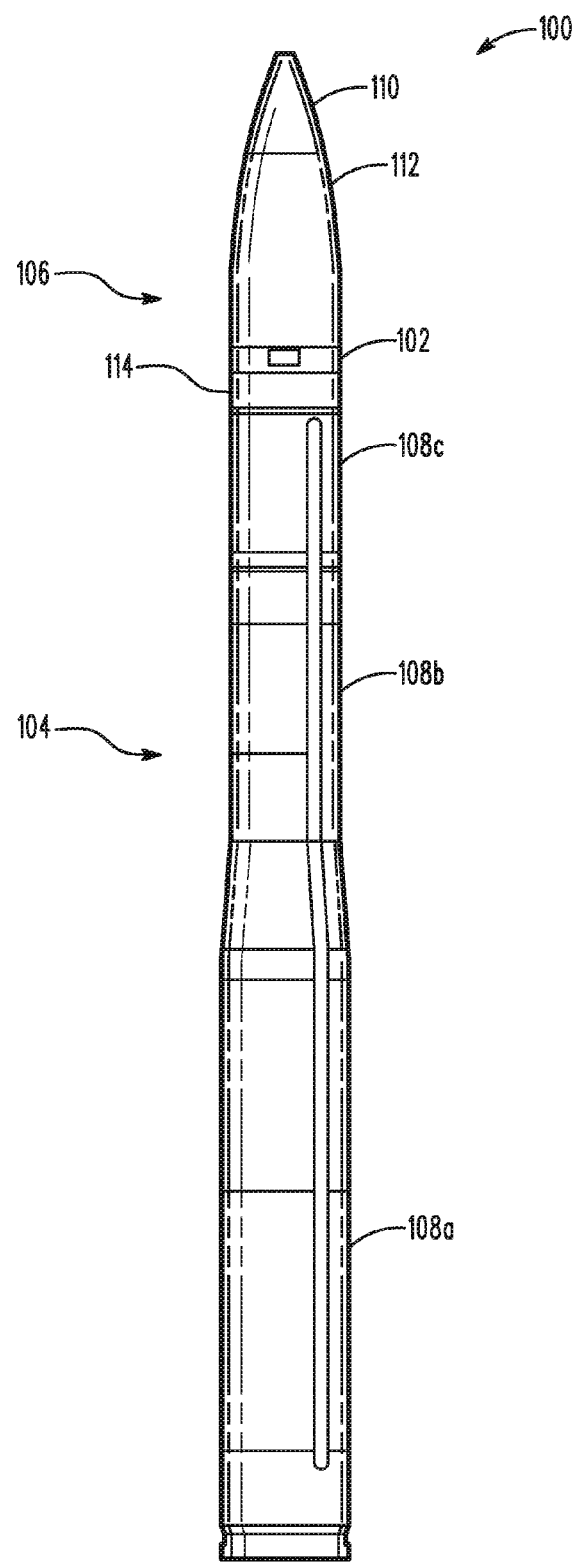
FIG. 1 is an illustration of an example intercontinental ballistic missile that may embody an example inertial measurement unit disclosed herein in accordance with the teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Example guidance systems and/or inertial measurement units (IMUs) disclosed herein enable provision of a relatively small, low-profile inertial guidance system. As a result, providing a low-profile inertial guidance system disclosed herein enables servicing, removal and/or replacement of a guidance system and/or an inertial measurement unit from a ballistic missile without significant disassembly of the ballistic missile. In other words, removal and/or replacement of the example guidance systems and/or inertial measurement units disclosed herein does not require removal of a nose cone and/or a weapons wafer of a ballistic missile. Instead, the guidance system and/or the inertial measurement unit disclosed herein may be removed from a side access panel providing an opening that is substantially perpendicular to a longitudinal axis of the ballistic missile. Thus, when servicing and/or replacing an inertial measurement unit of a ballistic missile, the example inertial measurement units disclosed herein significantly reduce complexity, security risk exposure and potential hardware damage, and are substantially less labor intensive than known guidance systems, resulting in significant cost savings by having significantly lower life cycle costs compared to known guidance systems.

Additionally or alternatively, because the inertial measurement units disclosed herein may be replaced via a side access panel without having to disassemble a ballistic missile, the example inertial measurement units disclosed herein may be replaced without having to remove a cover of a concrete silo. Instead, the guidance system and/or the inertial measurement unit may be lowered in the silo via an access hatch while the launch cover is maintained over the concrete silo. Thus, a technician can access and recover a failed system in the guidance wafer via the side access panel of the ballistic missile without having to remove sections of the ballistic missile from within the silo and replace it with the replacement guidance system provided via the access hatch. As a result, the weapons wafer containing nuclear warheads remains inside of the protective concrete silo when the guidance system and/or the inertial measurement unit are removed from the guidance wafer of the ballistic missile. Unlike known guidance systems used by ballistic missiles, which can take up to approximately 24 hours to recover and replace, the example guidance systems disclosed herein significantly reduce the time required to recover and replace a guidance system of a ballistic missile to approximately 2 hours of less.

FIG. 1 illustrates an example ballistic missile 100 (e.g., a Minuteman III missile system) having a guidance system that may embody aspects of the teachings of this disclosure. Although the present disclosure is illustrated with a ballistic missile, the example guidance systems and/or the example inertial measurement units disclosed herein may be used with spacecraft, airplanes, tactical missiles, and/or other accelerating objects that require inertial measurement units or motion-sensing or detecting apparatus to sense or detect, for example, acceleration.

Referring to FIG. 1, the ballistic missile 100 of FIG. 1 includes several components including a propulsion system 104, the guidance wafer 102 and a post-boost vehicle assembly 106 for reentry. The propulsion system 104 of the illustrated example includes a plurality of motors 108a-c to propel or thrust the ballistic missile 100 during various stages (e.g., stage I, stage II, and stage III) of flight of the ballistic missile 100. The post-boost vehicle assembly 106 separates from the various motors 108a-c prior to reentry to the atmosphere. The post-boost vehicle assembly 106 includes a nose or cone 110, a first or weapons wafer 112, the guidance wafer 102, a post-boost propulsion system wafer 114 (e.g., a second wafer). The nose or cone 110 houses and/or protects one or more weapons (e.g., warheads) coupled to the weapons wafer 112. In the illustrated example, the guidance wafer 102 is positioned or disposed between the weapons wafer 112 and the post-boost propulsion system 114.

Figure 2:
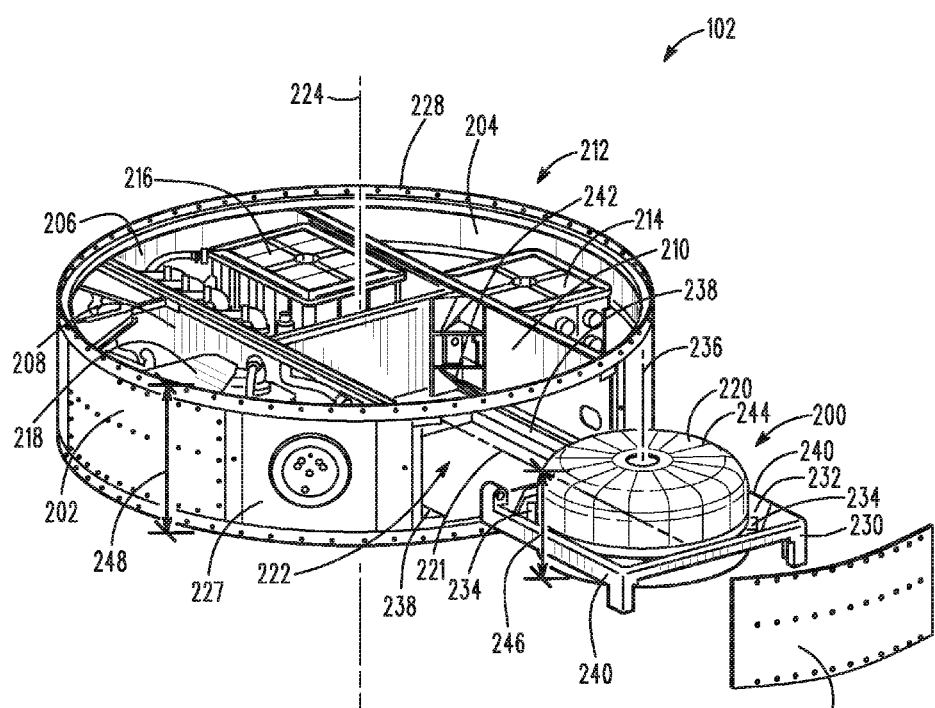
FIG. 2 illustrates a portion of the example missile of FIG. 1 that houses the example inertial measurement unit disclosed herein.

FIG. 2 illustrates a partial exploded view of the example guidance wafer 102 of the ballistic missile 100 shown in FIG. 1. The guidance wafer 102 is a cylindrical body or frame 202 having various cavities 204, 206, 208 and 210 to house various components 214, 216, 218 (e.g., a guidance set controller, a guidance computer, a battery, etc.) of a guidance system 212. As shown in the illustrated example, the various electronic components of the guidance system 212 include an inertial measurement unit 220.

More specifically, the inertial measurement unit 220 is disposed within the cavity 210 defined by the body 202 of the guidance wafer 102. The cavity 210 has an opening or side access port 222. In particular, the opening 222 enables insertion and/or removal of the inertial measurement unit 220 relative to the cavity 210 in a direction that is non-parallel or substantially perpendicular to a longitudinal axis 224 of the body 202 of the guidance wafer 102. To expose the opening 222 to enable access to the cavity 210, the body 202 includes a removable access panel 226. More specifically, the access panel 226 is removed from a side surface 227 of the guidance wafer 102. For example, the access panel 226 may be removably coupled to the side surface via, for example, a fastener and/or any other suitable fastening mechanism(s). In this manner, the inertial measurement unit 220 can be positioned inside the cavity 210 and/or removed from the cavity 210 of the guidance wafer via the opening 222. Although in the illustrated example the weapons wafer 112 and the post-boost propulsion system 114 have been removed for clarity, the inertial measurement unit 220 can be removed and/or positioned in the cavity 210 via the side access port 222 while the weapons wafer 112 is coupled to the guidance wafer 102 (e.g., covering a top opening 228 of the body 202 that is coaxially aligned with the longitudinal axis 224). In other words, the inertial measurement unit 220 can be removed and/or positioned in the cavity 210 of the guidance wafer 102 without the need to disassemble the ballistic missile 100.

In the illustrated example, the guidance wafer 102 employs a tray, carrier or slider 230 (or other mechanism) to facilitate insertion and/or removal of the inertial measurement unit 220 relative to the cavity 210 of the guidance wafer 102. As shown, the inertial measurement unit 220 is nested, fixed or secured in an opening 232 of the carrier 230 via fasteners 234 (e.g., set screws, clamps, etc.) disposed in each corner of the opening 232 of the carrier 230. In other words, the inertial measurement unit 220 is coupled or fixed to the carrier 230 to become substantially integral unit with the carrier 230. Additionally or alternatively, the carrier 230 couples the inertial measurement unit 220 to the body 202 of the guidance wafer 102 when the inertial measurement unit 220 is disposed within the cavity 210 of the body 202. In the illustrated example, the carrier 230 is fixed or secured to the body 202 via fasteners such as, for examples, rivets, screws, etc. In other words, the inertial measurement unit 220 and the carrier 230 are coupled to the guidance wafer 102 to provide an integral module when the carrier 230 is coupled to the body 202 of the guidance wafer 102.

To facilitate proper alignment and/or proper orientation of the inertial measurement unit 220 relative to the cavity 210 of the guidance wafer 102 (e.g., to maintain an axis 236 of the inertial measurement unit 220 substantially parallel relative to the longitudinal axis 224 of the guidance wafer 102), the cavity 210 may include tracks or rails 238 to receive, guide and/or otherwise engage respective rails 240 of the carrier 230. For example, a bracket 242 may be employed to couple the carrier 230 to an inner wall of the cavity 210. Thus, the inertial measurement unit 220 is slidably coupled relative to the cavity 210 via the carrier 230.

As shown, the inertial measurement unit 220 has a cylindrical body 244 having a dimensional height 246 that is less than a dimensional height 248 of the guidance wafer 102 and/or the cavity 210 to enable insertion and/or removal of the inertial measurement unit 220 and the carrier 230 via the opening 222. For example, the dimensional height 246 of the inertial measurement unit 220 or the body 244 may be approximately 10½ inches and the dimensional height 248 of the guidance wafer 102 and/or the cavity 210 may be greater than 10½ inches (but less than 20 inches). Unlike known guidance systems, the weapons wafer 112 may be coupled to the guidance wafer 102 during removal and/or insertion of the inertial measurement unit 220 relative to the cavity 210 of the guidance wafer 102.

Figure 3:
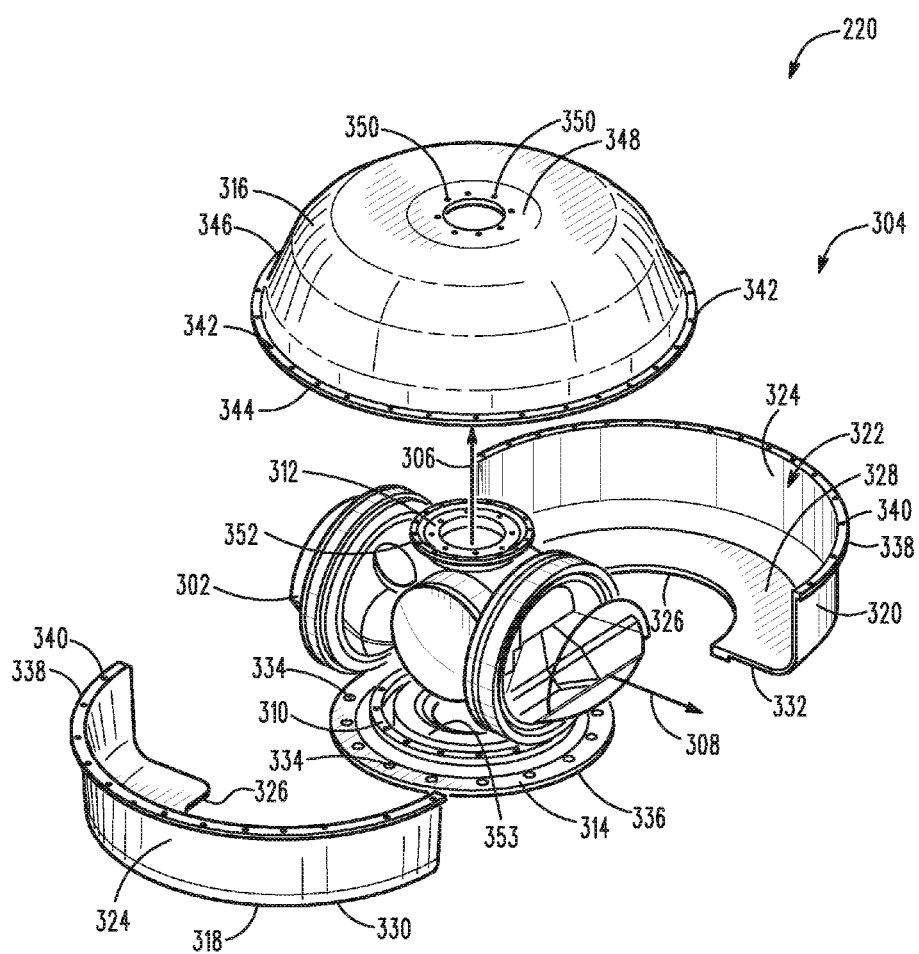
FIG. 3 illustrates an exploded view of the example inertial measurement unit of FIG. 2.

FIG. 3 is a partial exploded view of the inertial measurement unit 220 of FIG. 2. The inertial measurement unit 220 includes a gimbal 302 disposed in a housing 304. In particular, the gimbal 302 can rotate about a first axis of rotation 306 (e.g., a vertical axis) relative to the housing 304. The gimbal 302 can also rotate about a second axis of rotation 308 that is substantially perpendicular to the first axis of rotation 306. To enable rotation of the gimbal 302 about the first axis of rotation 306, the example inertial measurement unit 220 employs a first bearing or bushing 310 (e.g., a lower bearing) and a second bearing or bushing 312 (e.g., an upper bearing). In other words, the gimbal 302 is captured between the first and second bearings 310 and 312 to enable rotation of the gimbal 302 relative to the housing 304 about the first axis 306.

The housing 304 of the illustrated example includes a base 314, a cover 316, and side or clam shell-body including clam shell portions 318 and 320. The clam shell portions 318 and 320 can be separated to enable access to the gimbal 302. When coupled together, the clam shell portions 318 and 320 define a cavity or recessed opening 322. More specifically, the clam shell portions 318 and 320 have semi-arcuate (e.g., semi-circular) profiles or shapes and each of the portions 318 and 320 has a wall 324 that defines a portion of the recessed cavity 322 when the clam shell portions 318 and 320 are coupled together. The clam shell portions 318 and 320 also define an opening 326 adjacent a surface 328 of the recessed cavity 322 to receive or capture the gimbal 302 within the housing 304 and/or to receive at least a portion of the first bearing 310.

In the illustrated example, the clam shell portions 318 and 320 are coupled to the base 314 and the cover 316 via fasteners. For example, respective surfaces 330 and 332 (e.g., bottom surfaces) of the claim shell portions 318 and 320 include apertures (not shown) that align with apertures 334 formed in a peripheral edge 336 of the base 314 to receive fasteners. The clam shell portions 318 and 320 each include flange portions 338 having apertures 340 that align with respective apertures 342 formed in a flange portion 344 of the cover 316 to receive fasteners. The cover 316 of the illustrated example includes a wall 346 defining a central opening that defines at least a portion of the cavity 322 when the cover 316 is coupled to the clam shell portions 318 and 320. The cover 316 includes a hub 348 having apertures 350 to couple the cover 316 to a retainer portion 352 of the second bearing 312. Thus, in the illustrated example, the gimbal 302 rotates about the first axis of rotation 306 relative to the base 314, the cover 316, and the clam shell portions 318 and 320. A motor 353 is employed to control the roll rate about the first axis 306 and/or a resolver may be employed to measure and/or output a signal representative of the roll rate about the first axis 306.

Figure 4:
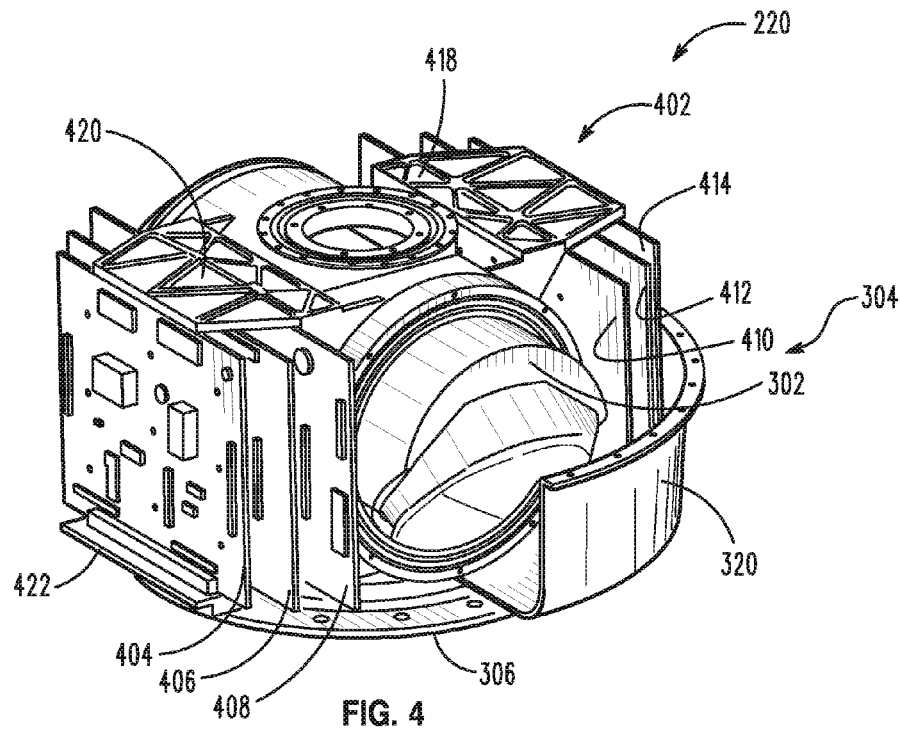
FIG. 4 illustrates a partial assembly of the example inertial measurement unit of FIGS. 2 and 3.

FIG. 4 illustrates a partial assembly of the inertial measurement unit 220. In FIG. 4, the cover 306 and the clam shell portion 318 are removed for clarity. As shown in FIG. 4, the housing 304 also houses or protects an electronic circuit system 402. The electronic circuit system 402 includes one or more circuit boards 404, 406, 408, 410, 412, 416 coupled to the gimbal 302 via an electronic chassis 418. The circuit boards 404-416 are captured between a first or upper chassis frame 420 and a second or lower chassis frame 422. The electronic circuit boards 404-416 define electrical circuits that are electrically coupled to the gimbal 302. For example, the electronic circuits receive and/or process signal outputs from motion detection sensors (e.g., accelerometers, gyroscopes, etc.) coupled to the gimbal 302.

Figure 5:
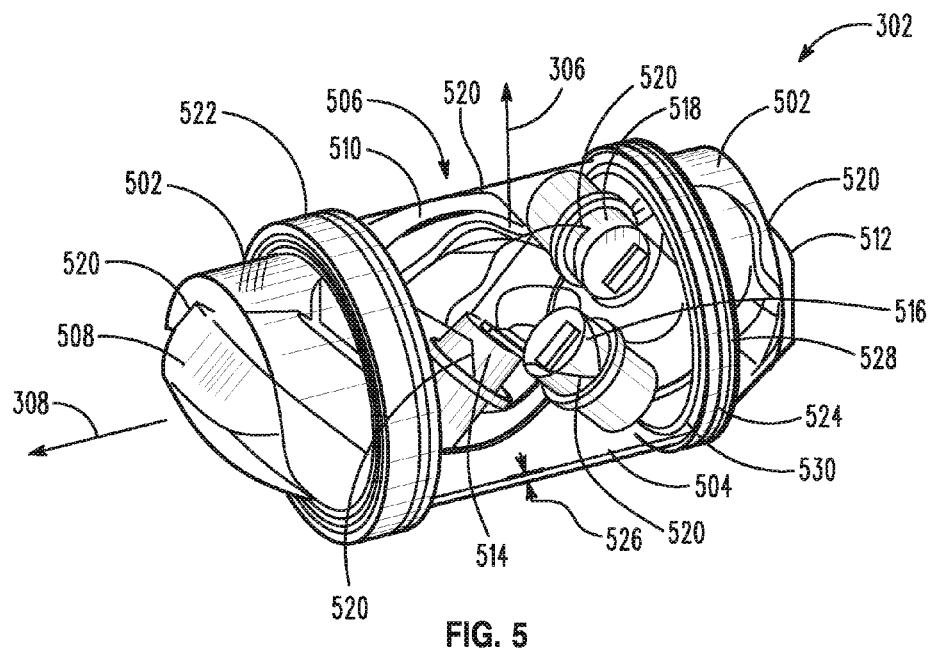
FIG. 5 illustrates an example gimbal of the example inertial measurement unit of FIGS. 2-4.

FIG. 5 illustrates the gimbal 302 of FIGS. 3 and 4. The gimbal 302 of the illustrated example employs a two axes gimbal system. For example, as noted above, the housing 340 of FIGS. 2-4 enables the gimbal 302 to rotate about the first axis of rotation 306 that may be representative of, for example, a roll axis. The gimbal 302 enables rotation about the second axis of rotation 308 that may be representative of, for example, a pitch axis.

To enable rotation about the second axis of rotation 308, the gimbal 302 of the illustrated example includes an inner gimbal 502 rotatably coupled to an outer gimbal 504. In the illustrated example, the inner gimbal 502 is a cylinder that holds an inertial measuring sensor, detector or instrument 506 such as, for example, a gyroscope, an accelerometer, a resolver, etc. For example, as shown in FIG. 5, the inner gimbal 502 includes three gyroscopes 508, 510 and 512 and three accelerometers 514, 516 and 518. However, in other examples, the inner gimbal 502 may include less than or more than three gyroscopes and/or accelerometers and/or other instruments. In the illustrated example, the inner gimbal 502 includes openings or cutouts 520 to receive or couple the respective gyroscopes 508-512 and accelerometers 514-518 to the inner gimbal 502. Additionally or alternatively, the cutout portions 520 maintain the position or orientation of the gyroscopes 508-512 and/or accelerometers 514-518 relative to the inner gimbal 502. As noted above, the gyroscopes 508-512 and the accelerometers 514-518 may be electrically coupled to the circuit boards 404-414 of FIG. 4. The inner gimbal 502 also holds one or more proximity sensors or other electronics that may be needed to support the instrument 506, the gyroscopes 508-512, and the accelerometers 514-518, and/or perform temperature control of the inner gimbal 502.

The gyroscopes 508-512 and accelerometers 514-518 monitor changes in ballistic missile 100 attitude and acceleration, respectively. For example, the use of three accelerometers 514-518, each positioned or oriented relative to each other to provide a measurement of the acceleration of the ballistic missile 100 in any direction. For example, each axis (e.g., a longitudinal axis) of the accelerometers 514-518 may be oriented perpendicular to each other or, alternatively, an axis of one of the accelerometers 514-518 may be oriented in a non-perpendicular relationship relative to an axis of another one of the accelerometers 514-518. From this measurement, the electronic system 402 or other logic circuit of the guidance system 212 can measure and/or determine the speed of the ballistic missile 100. The use of three gyroscopes 508-512 enables detection of earth rate rotation for azimuth alignment pre-flight and then in-flight detection of motion of the ballistic missile 100 in any direction. The information or measured values provided by the accelerometers 514-518 regarding the local vertical gravity pre-flight and in-flight acceleration of the ballistic missile 100 together with information or measured values provided by the gyroscopes 508-512 regarding the direction of the motion of the ballistic missile 100 allows a logic circuit to continually calculate the missile's flight path or course with or without input from external sources.

In the illustrated example, the inner gimbal 502 is operatively coupled or held to the outer gimbal 504 via bearings 522 and 524 (e.g., precision bearings). Additionally, a gap 526 between the inner gimbal 502 and the outer gimbal 504 is relatively small (e.g., approximately 0.02 inches) permitting thermal conduction across the gap 526 (e.g., an air gap) and inhibiting or preventing (e.g., relatively no) thermal convection, which is an error source that is very sensitive to g-forces. For example, the narrowness or dimensional width of the air gap 526 substantially prevents heat transfer via convection. As a result, the temperature within the inner gimbal 502 does not vary as a function of convection, enabling more precise temperature control. A motor 528 (e.g., a torque motor) is disposed between the inner and outer gimbals 502 and 504 to rotate the inner gimbal 502 relative to the outer gimbal 504 about the second axis of rotation 308. Additionally, a resolver 530 is disposed between the inner and outer gimbals 502 and 504 to detect or measure an angle or rotation between the inner and outer gimbals 502 and 504 when the inner gimbal 502 rotates relative to the outer gimbal 504 about the second axis of rotation 308. Thus, the resolver 530 may be employed to detect the pitch axis of the gimbal 302. The motor 528 and/or the resolver 530 may be electrically coupled to the electronic system 402 of FIG. 4.

Figure 6:
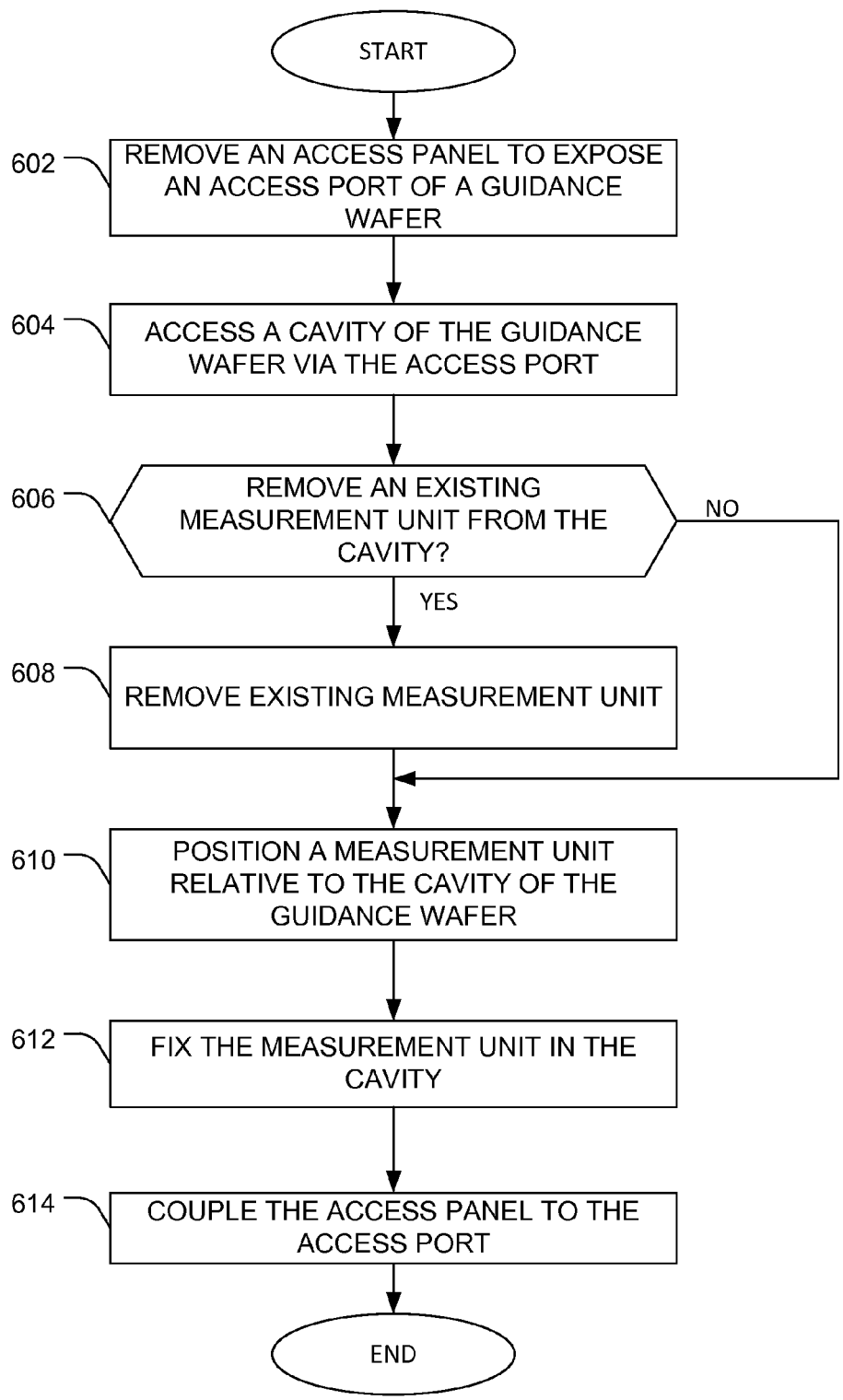
FIG. 6 illustrates a flowchart of an example method disclosed herein to replace a measurement unit from a guidance wafer.

FIG. 6 is a flowchart of an example method 600 that may be used to replace a measurement unit (e.g., the inertial measurement unit) from a guidance wafer such as, for example, the guidance wafer 102 of FIGS. 1-5. While an example manner of replacing the example measurement unit, one or more of the blocks and/or methods or operations illustrated in FIG. 6 may be combined, divided, re-arranged, omitted, eliminated and/or implemented in any other way. Further still, the example method of FIG. 6 may include one or more methods, steps and/or blocks in addition to, or instead of, those illustrated in FIG. 6, and/or may include more than one of any or all of the illustrated methods, steps and/or blocks. Further, although the example method 600 is described with reference to the flowchart illustrated in FIG. 6, many other methods of replacing a measurement unit from a guidance wafer may alternatively be used. While the method is described in connection with the example apparatus FIG. 2, the method may be applicable to other apparatus.

Initially, an access panel 226 is removed from the guidance wafer 102 to expose the access port 222 of the guidance wafer 102 (block 602). For example, the access panel 226 may be removed or decoupled from the side surface 227 of the guidance wafer 102. Additionally, because the axis 221 of the access port 222 is substantially perpendicular (e.g., or non-parallel) relative to the longitudinal axis 224 of the guidance wafer 102, the access panel 226 may be removed from the guidance wafer 102 while a weapons wafer 112 remains attached to the guidance wafer 102.

With the access panel 226 removed, the cavity 210 of the guidance wafer 102 is accessed via the access port 222 (block 604). If an existing measurement unit is positioned in the cavity 210 (block 606), then the existing measurement unit is removed from the cavity 210 (block 608). For example, the existing measurement unit may be decoupled from the body or frame 202 defining the cavity 210 (block 610).

If an existing measurement unit is not positioned in the cavity 210 at block 606, then a measurement unit (e.g., the inertial measurement unit 220) is positioned in the cavity 210 of the guidance wafer 102 (block 610). For example, the measurement unit 210 may be slid or positioned in the cavity 210 via the access port 222. In some examples, to position the measurement unit 220 relative to the cavity 210, the carrier 230 may be employed (e.g., the carrier of FIGS. 1-5). For example, the measurement unit 220 may be coupled to the carrier 230 via, for example, fasteners. Additionally or alternatively, in some examples, the measurement unit 220 may be nested relative to the carrier 230. After the measurement unit 220 is attached to the carrier 230, the carrier 230 and the measurement unit 220 may be slid in the cavity 210 via the access port 222. For example, the carrier 230 may engage the track 238 to ensure a more accurate positioning or orientation of the measurement unit 220 relative to the cavity 210.

The position of the measurement unit 220 is then fixed in the cavity 210 (block 612). For example, the measurement unit 220 may be fixed in the cavity 210 via the carrier 230. For example, the carrier 230 may engage the track 238 and/or may be fastened to the body or frame 202 defining the cavity 210. In some examples, the measurement unit 220 may be directly coupled to the body or frame 202 to maintain, secure or fix a position and/or orientation of the measurement unit 220 in the cavity.

After the measurement unit 220 is positioned in the cavity 210, the access panel 226 is coupled to the guidance wafer 102 to cover or otherwise close the access port 222 (block 614). For example, the access panel 226 may be coupled or attached (e.g., reattached) to the side surface 227 of the guidance wafer 102 via a fastener.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A guidance system comprising:
an inertial measurement unit removably coupled in a cavity of a guidance wafer via an access port of the guidance wafer defining a port axis that is non-parallel relative to a longitudinal axis of the guidance wafer.

2. The guidance system of claim 1, wherein the port axis is substantially perpendicular relative to the longitudinal axis of the guidance wafer.

3. The guidance system of claim 1, wherein the inertial measurement unit is disposed within a cavity defined by a body of the guidance wafer.

4. The guidance system of claim 3, wherein the guidance wafer further comprises a carrier to receive the inertial measurement unit, the carrier to facilitate insertion or removal of the inertial measurement unit relative to the cavity of the guidance wafer in a direction along the port axis.

5. The guidance system of claim 4, further comprising a track disposed within the cavity, the track to receive a rail of the carrier to orient the inertial measurement relative to the guidance wafer.

6. The guidance system of claim 1, wherein the guidance wafer further comprises a removable access panel to cover the access port.

7. The guidance system of claim 1, wherein the inertial measurement unit comprises a cylindrical body having a height that is less than a height of the guidance wafer.

8. The guidance system of claim 1, wherein the guidance wafer is coupled to a weapons wafer during removal or insertion of the inertial measurement unit relative to the cavity of the guidance wafer.

9. The guidance system of claim 1, wherein the inertial measurement unit comprises a gimbal disposed within a housing.

10. The guidance system of claim 9, wherein the housing comprises a cover, a base and a clam-shell body.

11. The guidance system of claim 10, wherein the gimbal is captured between a first bearing adjacent the cover and a second bearing adjacent the base to enable rotation of the gimbal relative to the housing about a first axis of rotation.

12. The guidance system of claim 11, wherein the gimbal comprises an inner gimbal rotatably coupled to an outer gimbal via respective third and fourth bearings, the third and fourth bearings to enable rotation of the inner gimbal relative to the outer gimbal about a second axis of rotation, the first axis of rotation being substantially perpendicular relative to the second axis of rotation.

13. The guidance system of claim 11, further comprising a gap formed between an inner gimbal and an outer gimbal, the gap to permit thermal conduction across the gap and to inhibit thermal convection across the gap.

14. A method of replacing a guidance system comprising:
opening an access port to a body of a guidance wafer, the access port to enable access to a cavity of the guidance wafer, the access port to provide an opening having an axis substantially perpendicular relative to a longitudinal axis of the guidance wafer; and
removing or inserting an inertial measurement unit relative to the cavity of the guidance wafer via the access port.

15. The method as defined in claim 14, further comprising removing an access panel to expose the access port.

16. The method as defined in claim 14, wherein removing or inserting the inertial measurement unit relative to the guidance wafer is performed without having to remove a weapons wafer that is attached to the guidance wafer.

17. The method as defined in claim 14, further comprising fixing the inertial measurement unit to a carrier.

18. The method as defined in claim 17, further comprising slidably positioning the inertial measurement unit in the cavity via the carrier and the access port.

19. A guidance system comprising:
means for measuring an inertia of a moving object; and
means for accessing a cavity of a guidance wafer to enable insertion or removal of the means for measuring relative to the cavity of the guidance wafer, the means for accessing defining an axis substantially perpendicular to a longitudinal axis of the guidance wafer.

20. The guidance system as defined in claim 19, further comprising means for removably coupling the means for measuring relative to the cavity of the guidance wafer.

21. A guidance system comprising:
a guidance wafer having a first side coupled to a first wafer and a second side coupled to a second wafer, the guidance wafer having a longitudinal axis coaxially aligned with respective longitudinal axes of the first and second wafers when the guidance wafer is coupled to the first and second wafers;
an access port formed in a body of the guidance wafer, the access port defining an opening to enable access to a cavity of the guidance wafer, the access port or the opening defining an axis that is substantially perpendicular to the longitudinal axis of the guidance wafer;
a panel removably coupled to the body of the guidance wafer, the panel to expose the opening of the access port when the panel is removed from the body; and
an inertial measurement unit removably coupled in the cavity of the guidance wafer, the inertial measurement unit to be inserted or removed from the cavity via the opening of the access port when the panel is removed from the body of the guidance wafer.

22. The guidance system of claim 21, further comprising a carrier coupled to the inertial measurement unit, the carrier to removably couple the inertial measurement unit relative to the cavity.

* * * * *